United States Patent
So et al.

[15] 3,706,966
[45] Dec. 19, 1972

[54] AUTOMOTIVE BURGLAR ALARM HAVING BATTERY CURRENT FLOW DETECTOR

[72] Inventors: Richard T. So, Chicago; Reinhold Mueller, Arlington Heights, both of Ill.

[73] Assignee: Solidyne Corp., Arlington Heights, Ill.

[22] Filed: Dec. 7, 1970

[21] Appl. No.: 95,829

Related U.S. Application Data

[63] Continuation-in-part of Ser. No. 811,967, April 1, 1969, abandoned.

[52] U.S. Cl. ............... 340/63, 340/253 P, 340/248 P
[51] Int. Cl. ............................................... B60r 25/10
[58] Field of Search ..... 340/63, 64, 65, 253 P, 248 P, 340/253 R, 276; 307/10

[56] References Cited

UNITED STATES PATENTS

| | | | |
|---|---|---|---|
| 3,569,929 | 3/1971 | Wood | 340/63 |
| 3,422,398 | 1/1969 | Rubin | 340/63 |
| 3,553,641 | 1/1971 | Moragne | 340/64 |

*Primary Examiner*—Alvin H. Waring
*Attorney*—Silverman & Cass

[57] ABSTRACT

An alarm device is energized when any current is drawn from the battery employed in the electrical system of the automotive vehicle. The onset of battery current is utilized to produce a voltage pulse, which is employed to trigger a silicon controlled rectifier. The rectifier energizes a relay coil which operates relay contacts connected to the alarm device. The voltage pulse preferably is produced by a magnetic pickup coil mechanically coupled to the battery cable of the electrical system. In a second embodiment, the instantaneous battery voltage is compared with the stable voltage across a capacitor charged to the initial battery voltage. Any drop in the instantaneous voltage produces a voltage pulse which triggers the electronic switch. In a third embodiment, two of the leads to the silicon controlled rectifier are connected to the negative battery cable between the negative battery terminal and ground, between which an SCR triggering voltage drop develops when current is drawn from the battery. In each of the embodiments, if the SCR is bypassed initially, it is connected to be latched by avalance operation. The burglar alarm can be encapsulated as a module and can be coupled electrically into the vehicles' electrical system easily, without any splicing of existing wiring. The magnetic pickup coil of the primary embodiment is subject to sensitivity regulation by way of a clamp which mounts and orients the module with respect to the battery cable.

16 Claims, 4 Drawing Figures

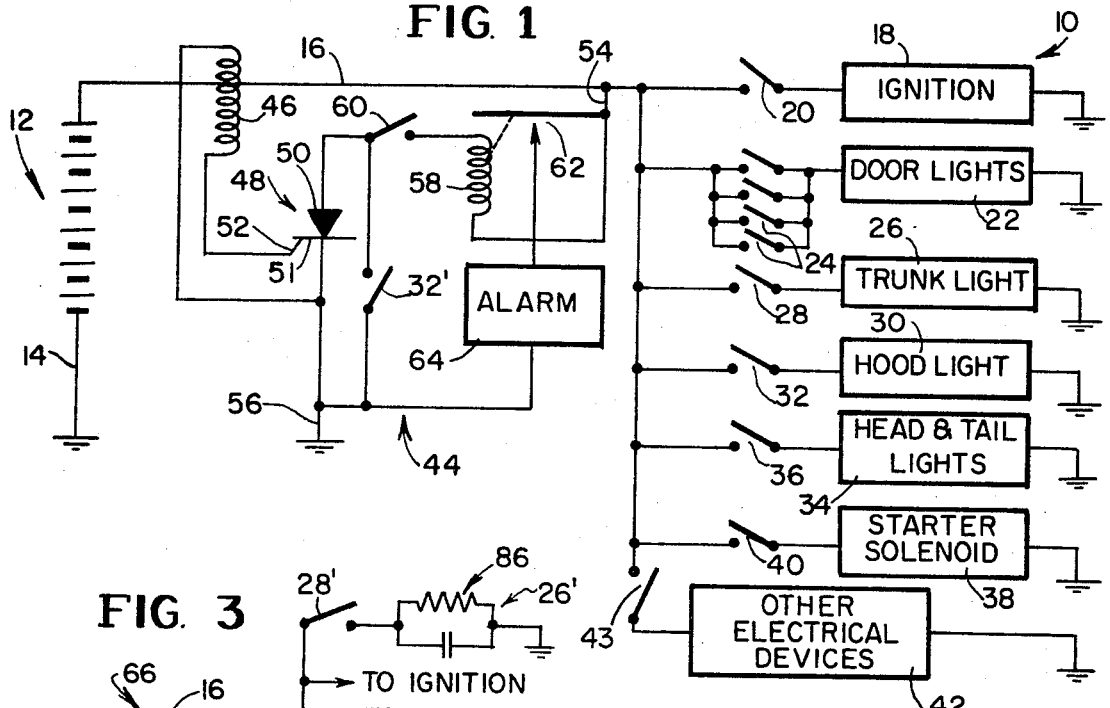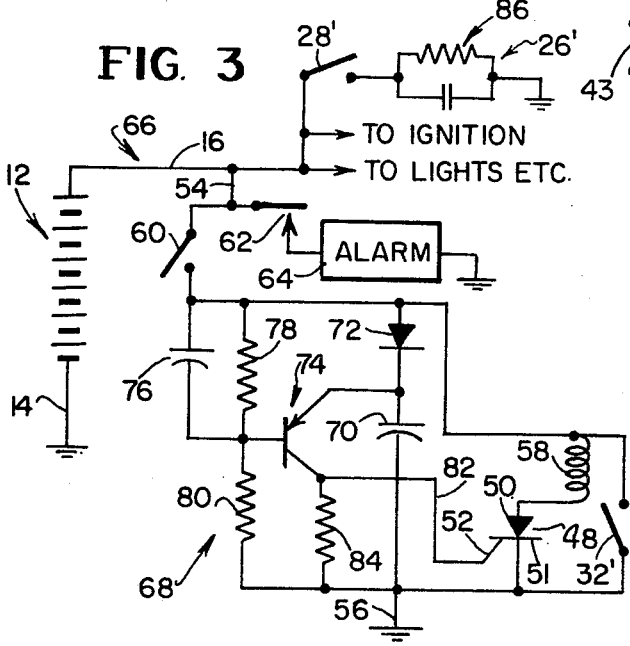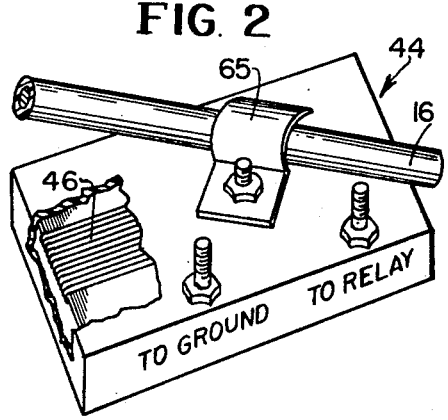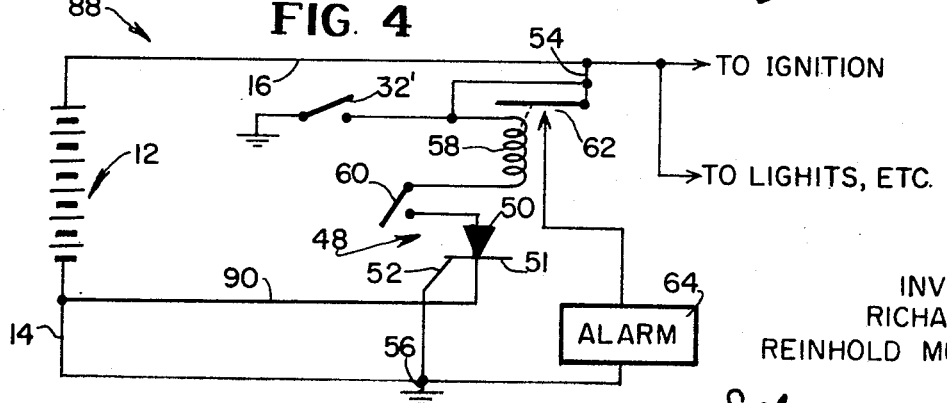
INVENTORS
RICHARD T. SO
REINHOLD MUELLER
BY *Silverman & Cass*
ATTYS.

AUTOMOTIVE BURGLAR ALARM HAVING BATTERY CURRENT FLOW DETECTOR

CROSS-REFERENCE TO RELATED APPLICATIONS

This is a continuation-in-part of our copending application entitled "Burglar Alarm System For Automotive Vehicles," Ser. No. 811,967, filed on Apr. 1, 1969, now abandoned.

BACKGROUND OF THE INVENTION

This invention relates to burglar alarm systems for automobiles or other automotive vehicles.

The burglar alarm systems of the present invention operate upon the general principle of energizing the burglar alarm when any current is drawn from the battery of the automotive vehicle. When a vehicle is parked and undisturbed, current normally is not drawn from the battery. If any unauthorized person enters the vehicle or attempts to drive it away, current will be drawn from the battery, due to the actuation of one of more electrical devices in the automobile, i.e., if a thief opens a door of the vehicle, the normal door switch energizes the dome light in the vehicle. Door switches can easily be installed on all doors, if the vehicle is not originally so equipped. If a thief attempts to start the vehicle, the ignition circuit and the starter circuit will draw current from the battery. Any operation of the headlights or any other lighting equipment will result in a current drain from the battery. The hood of the vehicle can readily be equipped with a switch so that a hood light will be energized under the hood when the hood is opened, or so that a system triggering signal will be transmitted.

It will be evident that a thief can not disturb the vehicle to any great extent without causing a drain of current from the battery. The present invention triggers the operation of the burglar alarm system in response to the onset of any battery current.

One disadvantage of existing alarm systems for automobiles is that they often require several components and must be spliced into existing sections of the automobile's somewhat complex electrical network; accordingly, such prior art alarms are costly to purchase, costly to install and could be costly to maintain operative.

SUMMARY OF THE INVENTION

One principal object of the present invention is to provide a burglar alarm system which is triggered by battery current, but which does not require any tapping into or diversion of the battery current. Thus, it is an object of the present invention to provide a burglar alarm system which can readily be connected to the electrical system of the vehicle by the motorist himself, without any expert assistance. The attachment of the burglar alarm system involves nothing more complicated than connecting two or three leads to the electrical system, without breaking into any of the existing leads of the electrical system.

In accordance with the present invention, the burglar alarm system utilizes an electronic switching component, preferably a silicon controlled rectifier, which can be triggered by a small voltage pulse. The output circuit of the electronic switching components is connected to the alarm device, which may be a siren, horn or the like. The output circuit preferably comprises a relay coil connected in series with the main electrodes of the SCR, and relay contacts operable by the coil to energize the alarm device.

The input pulse for triggering the electronic switching component can be derived in several different ways. In accordance with one preferred arrangement, a magnetic pickup coil is connected between the control element and one electrode of the SCR. The pickup coil is fastened mechanically against one of the battery cables, so as to intercept the magnetic field due to any battery current. Thus, there is an inductive action, whereby the onset of the battery current produces a voltage pulse in the pickup coil. This pulse triggers the SCR into its conductive state.

In the event the pickup coil can be circumvented, a shunting switch is provided and, once the alarm is activated by way of the shunting switch, its reopening triggers the SCR into avalanche operation.

In another arrangement, the voltage pulse is produced by detecting and utilizing the instantaneous voltage drop when current is drawn from the battery, which is compared with a stable voltage across a storage capacitor which is charged to the initial voltage.

In still another arrangement, the voltage pulse is derived by connecting two different input leads of the SCR to spaced points along one of the battery cables.

Further objects, advantages and features of the present invention will appear from the following description, taken with the accompanying drawings, in which:

BRIEF DESCRIPTION OF THE DRAWINGS

FIG. 1 is a schematic wiring diagram of an automotive electrical system, equipped with a burglar alarm system constituting one embodiment of the present invention;

FIG. 2 is a perspective view of an alarm module housing the alarm system shown in FIG. 1;

FIG. 3 is a fragmentary wiring diagram showing a modified burglar alarm system constituting a second embodiment; and FIG. 4 is another fragmentary wiring diagram showing a third embodiment.

DESCRIPTION OF THE PREFERRED EMBODIMENTS

FIG. 1 shows the invention as applied, by way of example, to an automotive electrical system 10, comprising a battery 12 for energizing the various electrical utilization devices and appliances on the vehicle. As shown, a grounded cable 14 and an ungrounded cable 16 are connected to the battery 12. Conventionally, the grounded cable 14 is connected to the frame of the vehicle. All of the utilization devices are energized between the ungrounded cable 16 and ground. In most cases, each utilization device is provided with an individual control switch which may be operated to energize or deenergize the particular device.

The electrical system 10 of FIG. 1 comprises an ignition circuit 18, which is connected to the ungrounded cable 16 through an ignition switch 20. Door lights 22 are connected to the battery cable 16 by means of door switches 24, arranged in parallel. Thus, the closure of any door switch will energize the door lights. For the utmost protection, each door of the vehicle should be equipped with a door switch. A trunk light 26, with its control switch 28 are provided. Likewise, an under-the-hood light 30 is provided with a control switch 32, which closes automatically when the hood is opened. The vehicle further includes head and tail lights 34, controlled by a switch 36. A starter solenoid 38 and switch 40 are provided. The vehicle may include various other electrical devices 42, some or all of which may be equipped with individual control switches, represented by a switch 43.

It will be evident that current will be drawn from the battery 12 whenever any of the electrical lights, appliances or devices is energized. It will be impossible for a thief to disturb or operate the vehicle without causing one of the electrical devices to draw current from the battery.

The electrical system 10 of FIG. 1 is equipped with a burglar alarm system 44 which is actuated in response to the onset of battery current. Preferably, the battery current is detected by providing an inductive arrangement utilizing a pickup coil 46, which intercepts the magnetic field produced by the battery current in one of the battery cables. In this case, the pickup coil 46 is coupled inductively to the battery cable 16, but it could be coupled to the battery cable 14. The pickup coil 46 may be fastened mechanically to the battery cable 16 so that the magnetic coupling between the battery cable and the pickup coil is as close as reasonably possible.

Whenever any electrical light or other device is turned on, the increase in current produces an expanding magnetic field around the battery cable which induces a voltage pulse in the pickup coil 46. This pulse is employed to trigger an electronic switching component 48. While the electronic switching component 48 may assume various forms, it is shown as a SCR having main electrodes 50 and 51, and a control electrode, element or gate 52. The illustrated electrodes 50 and 51 are the positive and negative electrodes respectively.

The pickup coil 46 is connected between the gate 52 and one main electrode 51 of the SCR 48. The SCR has an output circuit which is energized from the battery 12. Thus, energizing leads 54 and 56 are connected to the battery cable 16 and ground, respectively. In the illustrated arrangement, the output circuit comprises a relay coil 58 and a shutoff switch 60, connected in series with the main electrodes 50 and 51 between the energizing leads 54 and 56. The relay coil 58 is adapted to operate relay contacts 62 which are connected to an alarm device 64. Various alarm devices may be employed, such as a siren, horn, or the like. The contact 62 and the alarm device 64 may be connected in series between the energization leads 54 and 56.

When the motorist parks and locks the automobile, he closes the switch 60, to energize the burglar alarm system 44. To prevent unauthorized operation of the shutoff switch 60, it may be concealed, or of the key type, or both. As long as the vehicle remains undisturbed, there is no battery current to trigger the SCR 48. Consequently, it is nonconductive.

If any would-be thief disturbs the vehicle, inevitably he will energize one of the lights or other electrical utilization devices. Thus, a current will be drawn from the battery 12. The expanding magnetic field around the battery cable 16, due to the onset of battery current, induces a voltage pulse in the pickup coil 46. Such pulse triggers the SCR 48 so that it becomes conductive between the main electrodes 50 and 51. The resulting current through the relay coil 58 closes the relay contact 62 so as to energize the alarm device 64. The SCR 48 will remain conductive until the shutoff switch 60 is opened by the motorist. It will be understood that the motorist will open the shutoff switch 60 before entering the vehicle, so as to avoid setting off the burglar alarm.

In the event that the vehicle lacks an under-the-hood light 30, with a corresponding switch 32, there can be installed a switch, such as 32', which will be electrically closed when the hood or like area is opened. The switch 32' shunts the SCR 48, as shown in FIG. 1, with one side of the switch being connected between the SCR and the relay coil 58, and the other side of the switch being connected to the energizing lead 56, i.e., ground. Thus, when the switch 32' is closed by the activity of a would-be thief, the circuit path from energizing lead 54 to 56, through the relay coil 58, is completed and the alarm 64 is energized, just as if the SCR 48 had been triggered in the manner earlier described. However, the switch 32' need not be a latching switch, such as an SCR, which will remain closed once the would-be thief shuts the hood in the hope that the alarm 64 will turn off. The SCR 48 will furnish the need latching of the alarm circuit when the switch 32' reopens, when the hood is reclosed. Such latching is enabled by the relay coil 58 when the switch 32' reopens. By its nature as an inductance, the relay coil 58 resists the termination of the circuit current flow when the switch 32' is reopened and produces a sufficiently large voltage transient to exceed the the forward breakdown voltage of the SCR 48 and drives it into an avalanche condition of conduction, which thereafter requires the opening of the switch 60 to turn off the alarm 64.

FIG. 2 shows a perspective view of the alarm system 44 as it could be encased as an easily installed module and mechanically mounted to the battery cable 16 by a clamp 65, so that the encapsulated pickup coil 46 would be influenced by the magnetic field around the cable 16. The clamp 65 provides an electronic sensitivity control, by permitting the orientation of the pickup coil 46 relative to the cable 16 to be adjusted from a maximum —parallel— orientation to a minimum —orthogonal— orientation. In this manner, sensitivity of the pickup coil 46 can be reduced to cause it to "ignore" comparatively small current surges or pulses produced by an electrical clock in the vehicle and thus prevent false triggering of the alarm system.

As illustrated, the alarm system module 44 is provided with a TO GROUND and a TO RELAY terminal; these being the only two electrical connections required to install the module. In the event that a switch 32' was desired, one side of it would be connected to the TO RELAY terminal.

FIG. 3 shows a modified burglar alarm system 66 which is applied to the same basic electrical system as in FIG. 1. A modified input circuit 68 is provided to supply the triggering voltage pulse to the electronic switching component 48. In this case, the voltage pulse is produced by sensing the voltage drop in the electrical system which occurs when current is drawn from the battery. This voltage drop is due to the internal resistance of the battery and the resistance of the battery cables 14 and 16.

To generate the voltage pulse, the instantaneous battery voltage is compared with the initial voltage. In effect, the initial voltage is noted or recorded by utilizing a storage capacitor 70 which is charged from the battery voltage in such a manner that it can not be discharged rapidly. Thus, in this case, the capacitor 70 is charged through a diode rectifier 72, which are connected in series between the energization leads 54 and 56. The shutoff switch 60 is shown as being in series with the lead 54, but may be in series with the lead 56.

It is preferred to amplify the signals resulting from comparison of the instantaneous battery voltage with the capacitor voltage. For this purpose, the comparison circuit utilizes an electronic amplifier in the form of a transistor 74, with the voltage across the capacitor 70 being applied to the emitter of the transistor 74. The instantaneous battery voltage is applied to the base of the transistor 74 by means of a coupling capacitor 76. A biasing resistor 78 is connected across the coupling capacitor 76, and another biasing resistor 80 is connected between the base of the transistor 74 and ground.

The output of the transistor 74 is coupled directly to the electronic switching component 48 by means of a lead 82 between the collector of the transistor 74 and the gate 52 of the electronic switch 48. A load resistor 84 is connected between the collector of the transistor 74 and ground.

When the motorist parks and locks the vehicle, he closes the switch 60 and the capacitor 70 is charged to the full battery voltage. Suppose, by way of example, that this voltage is 12.6 volts. If any would-be thief disturbs the vehicle, current will be drawn from the battery 12. Due to the internal resistance of the battery and the resistance of the battery cables 14 and 16, the available battery voltage will be dropped slightly. Suppose, for example, that the battery voltage drops to 12.5 volts. The voltage across the capacitor 70 remains unchanged, because it can not discharge through the diode 72. The slight voltage difference is applied between the emitter and base of the transistor 74 and is amplified to produce a larger triggering voltage at the gate 52 of the SCR 48. Accordingly, the SCR 48 becomes conductive, so as to energize the relay coil 58 and the alarm device 64.

In the event a current drawing device is lacking in an area of the vehicle, the switch 32' can be provided, as previously discussed, to trigger the alarm and then drive the SCR into avalanche mode. Alternately, a current drawing device can be installed. For example, if the trunk light fixture 26 and switch 28 were not present in a vehicle, an equivalent module 86 easily can be installed in the specific area, i.e., the trunk. The module could comprise a parallel resistor and capacitor combination 26' to be the equivalent of a light bulb, and there would also be provided a trunk opening switch 28'. Obviously, the module 86 can be used in the FIG. 1 embodiment.

Another modified burglar alarm 88 is shown in FIG. 4. In this case, the voltage pulse to trigger the electronic switch 48 is derived by sensing the voltage drop along one of the battery cables 14. In this case, the burglar alarm 88 requires a third energizing lead 90, in addition to the leads 54 and 56. As before, the leads 54 and 56 are connected to the ungrounded battery cable 16 and to ground, respectively. The third energizing lead 90 is connected between the negative terminal of the battery 12 and the negative main electrode 51 of the SCR 48, and the grounded lead 56 is connected to the gate 52.

When the motorist parks and locks the vehicle, he closes the shutoff switch 60. Any current which thereafter may be drawn from the battery 12 produces a voltage drop along the length of the battery cable 14, with the result that the gate electrode 52 is placed at a more positive potential than the negative electrode 51. This voltage drop is sufficient to trigger the SCR so that it becomes conductive. Thus, the relay coil 58 and the alarm 64 are energized. The above discussed switch 32' and module 86 can be employed in this embodiment.

It will be evident that the motorist easily can install the disclosed burglar alarms himself, without any need for expert assistance. It is not necessary to break into or remove any lead or other component of the existing electrical system. It merely is necessary to attach two or three energizing leads. In the burglar alarms 44 and 66 of FIGS. 1 and 3, only two energizing leads 54 and 56 are needed; unless the switch 28' is employed, and three leads are needed. These leads are attached to the ungrounded battery cable 16 and to the frame of the automobile which serves as the common ground. In the burglar alarm 44 of FIG. 1, the pickup coil 46 is secured to the battery cable 16 or 14, or at least is mounted for inductive coupling therewith.

In the burglar alarm 88 of FIG. 4, the third energizing lead 90 is fastened to the negative battery terminal. The other two leads 54 and 56 are the same as before.

In each case, the entire burglar alarm can be supplied in a small package, as shown in FIG. 2, which can be mounted very easily and conveniently under the hood of the vehicle. Inasmuch as all installation problems are obviated, the burglar alarm can be sold to a mass market for installation by the individual motorist.

Although the alarm 64 has been discussed and illustrated with reference to activation by way of the relay coil 58 and the relay contacts 62, it should be appreciated that other alarm activation means are available and that this specific disclosure is not to be limiting. Likewise, the voltage transient for producing the avalanche condition of the SCR can be derived from other than a relay coil.

Various other modifications, alternative constructions and equivalents may be employed, as will be understood by those skilled in the art.

We claim:

1. A burglar alarm for an automotive vehicle of the type having an electrical system, including a battery having internal battery resistance, battery terminals and cables, and at least one electrical utilization device, with a control switch between the battery and the utilization device, said burglar alarm comprising:

an electronic switching component having electrodes;

a current change sensitive means in the form of a magnetic pickup coil positioned closely adjacent to one of said battery cables, and thus alined within the magnetic field of said one battery cable, yet not directly electrically connected to said one battery cable or across said battery terminals;

said pickup coil being responsive to an expanding magnetic field around said one battery cable, induced by the onset of current from the battery to at least one of said utilization devices in the electric system, for producing a voltage pulse;

said pickup coil being connected in a series loop between two different of said electrodes of said electronic switching component for supplying the said voltage pulse to trigger said electronic switching component;

the construction of said pickup coil and its connection within said burglar alarm being such that the production of its said voltage pulse is independent of the internal battery resistance;

an alarm device; and an output circuit connected between said electronic switching component and said alarm device, for actuating said alarm device in response to the triggering of said electronic switching component.

2. A burglar alarm according to claim 1 in which said electronic switching component comprises a silicon controlled rectifier; and said output circuit includes:

a relay coil and shutoff switch connected in series with the main electrodes of said silicon controlled rectifier, energizing leads constructed for connection to the electrical system of the vehicle, and relay contacts operable by said relay coil for energizing said alarm device.

3. A burglar alarm according to claim 2 in which at least one said utilization device comprises a switch connected so as to shunt said rectifier and having one side connected to said relay coil, whereby closing of said switch actuates said alarm in lieu of triggering said rectifier, and reopening of said switch causes said relay coil to drive said rectifier into an avalanche mode of operating for continuing the actuation of said alarm.

4. A burglar alarm according to claim 3 in which said pickup coil is connected between the control electrode and one of the main electrodes of said rectifier, and the shunting switch is connected between said one main electrode and the other of the main electrodes of said rectifier.

5. A burglar alarm according to claim 1 in which said electrical system includes an illumination bulb simulating circuit for drawing current from said battery as a selectively enabled utilization device and comprising, a parallel connected resistor and capacitor.

6. A burglar alarm according to claim 1 in which said pickup coil is encapsulated, mechanical clamping means is provided for mounting said encapsulated coil onto said one battery cable, and said clamping means is constructed and arranged for orientation of said pickup coil in various positions of magnetic sensitivity with respect to the magnetic field around said battery cable.

7. A burglar alarm for an automotive vehicle of the type having an electrical system, including a battery, battery cables and at least one utilization device, with a control switch between the battery and the utilization device, said burglar alarm comprising:

an electronic switching component, input means coupled to the electrical system for supplying a voltage pulse to trigger said electronic switching component in response to the onset of current from the battery in the electrical system, said input means comprising a pair of input leads connected to two spaced points along one of the battery cables in the electrical system, between which a voltage drop is produced when current is drawn from the battery, said leads being connected to the electronic switching component to apply thereto said triggering voltage pulse, an alarm device, and an output circuit connected between said electronic switching component and said alarm device, for actuating said alarm in response to the triggering of said electronic switching component.

8. A burglar alarm according to claim 7 in which said electronic switching component comprises a silicon controlled rectifier, and said leads are connected to the control element and one electrode of said silicon controlled rectifier, so that the rectifier is triggered by a voltage drop between said leads.

9. A burglar alarm according to claim 8 in which said output circuit comprises a relay coil and a shutoff switch connected in series with said rectifier, and relay contacts operable by said relay coil and connected to said alarm device.

10. A burglar alarm according to claim 9 in which at least one said utilization device comprises a switch connected so as to shunt said rectifier and has one side connected to said relay coil, whereby closing of said switch actuates said alarm in lieu of triggering said rectifier, and reopening of said switch causes said relay coil to drive said rectifier into an avalanche mode of operating for continuing the actuation of said alarm.

11. A burglar alarm for an automotive vehicle of the type having an electrical system, including a battery and at least one utilization device, with a control switch between the battery and the utilization device, said burglar alarm comprising:

an electronic switching component, input means coupled to the electrical system for supplying a voltage pulse to trigger said electronic switching component in response to the onset of current from the battery in the electrical system, said input means comprising means for noting the initial battery voltage in the electrical system when current is not being drawn from the battery and means for comparing the instantaneous battery voltage with the initial battery voltage to produce said voltage pulse when the instantaneous voltage drops due to any current being drawn from the battery, an alarm device, an output circuit connected between said electronic switching component and said alarm device for actuating said alarm device in response to triggering of said electronic switching component said input means further comprising energizing leads constructed for connection to the electrical system to receive the voltage therein due to the battery, a storage capacitor, means connected to said leads for charging said storage capacitor to the initial battery voltage while preventing rapid discharge of said capacitor, and said means for comparing comprising means for comparing the instantaneous battery voltage across said leads with the voltage across said storage capacitor to derive a voltage pulse due to the instantaneous voltage drop when current is drawn from the battery.

12. A burglar alarm according to claim 11 in which said electronic switching component comprises a silicon controlled rectifier having its control element connected to said comparing means, so that the rectifier is triggered by said voltage pulse.

13. A burglar alarm for an automotive vehicle of the type having an electrical system, including a battery and at least one utilization device, with a control switch between the battery and the utilization device, said burglar alarm comprising:

an electronic switching component, input means coupled to the electrical system for supplying a voltage pulse to trigger said electronic switching component in response to the onset of current from the battery in the electrical system, said input means comprising means for noting the initial battery voltage in the electrical system when current is not being drawn from the battery and means for comparing the instantaneous battery voltage with the initial battery voltage to produce said voltage pulse when the instantaneous voltage drops due to any current being drawn from the battery, an alarm device, an output circuit connected between said electronic switching component and said alarm device for actuating said alarm device in response to triggering of said electronic switching component;

a storage capacitor;

means including a diode for charging said storage capacitor to the initial battery voltage, said diode preventing rapid discharge of said capacitor; and in which said electronic switching component comprises a silicon controlled rectifier, said output circuit comprises a relay coil connected in series with the main electrodes of said rectifier, and relay contacts operable by said coil and connected to said alarm device, said input means comprises leads constructed for connection to the electrical system to receive the battery voltage at a point in the system subject to voltage drop due to battery current, and said means for comparing comprises means for comparing the instantaneous battery voltage with the voltage across said capacitor.

14. A burglar alarm according to claim 13 in which at least one said utilization device comprises a switch connected so as to shunt said rectifier and having one side connected to said relay coil, whereby closing of said switch actuates said alarm in lieu of triggering said rectifier, and reopening of said switch causes said relay coil to drive said rectifier into an avalanche mode of operating for continuing the actuation of said alarm.

15. A burglar alarm according to claim 14 which further comprises an electronic control component having one control element connected to said capacitor and another control element connected to one of said leads to receive the instantaneous battery voltage, and said comparing means includes a coupling circuit between said electronic control component and the control element of said silicon controlled rectifier, to supply said triggering voltage pulse thereto in response to a drop in the battery voltage due to current being drawn from the battery.

16. A burglar alarm according to claim 1 in which at least one said utilization device comprises a switch connected so as to shunt said electronic switching component and has one side connected to said output circuit, whereby closing of said shunt switch directly actuates said alarm in lieu of triggering said electronic switching component, and reopening of said switch causes said output circuit to generate a voltage transient to drive said electronic switching component into an avalanche mode of operating for continuing the actuation of said alarm.

* * * * *